(12) United States Patent
Choi et al.

(10) Patent No.: US 8,931,979 B2
(45) Date of Patent: Jan. 13, 2015

(54) CUTTING INSERT HAVING CUTTING EDGES DIVIDED BY RECESSES AND A MILLING CUTTER PROVIDED WITH THE SAME

(75) Inventors: Chang Hee Choi, Daegu (KR); Chang Gyu Park, Daegu (KR)

(73) Assignee: TaeguTec, Ltd., Dalsung-gun, Daegu (KR)

( * ) Notice: Subject to any disclaimer, the term of this patent is extended or adjusted under 35 U.S.C. 154(b) by 183 days.

(21) Appl. No.: 13/579,501

(22) PCT Filed: Feb. 18, 2011

(86) PCT No.: PCT/KR2011/001089
§ 371 (c)(1),
(2), (4) Date: Aug. 16, 2012

(87) PCT Pub. No.: WO2011/102670
PCT Pub. Date: Aug. 25, 2011

(65) Prior Publication Data
US 2012/0308317 A1    Dec. 6, 2012

(30) Foreign Application Priority Data
Feb. 19, 2010   (KR) .......................... 10-2010-0015388

(51) Int. Cl.
*B23C 5/20*   (2006.01)
*B23C 5/06*   (2006.01)

(52) U.S. Cl.
CPC . *B23C 5/06* (2013.01); *B23C 5/207* (2013.01); *B23C 2200/0416* (2013.01); *B23C 2200/128* (2013.01); *B23C 2200/205* (2013.01); *B23C 2200/326* (2013.01); *B23C 2200/367* (2013.01)
USPC ................ 407/113; 407/42; 407/115; 407/61

(58) Field of Classification Search
USPC ................................. 407/42, 48, 61, 113–116
See application file for complete search history.

(56) References Cited

U.S. PATENT DOCUMENTS 3,701,187 A    10/1972   Erkfritz
4,180,355 A *  12/1979   Nanini .......................... 407/113
(Continued)

FOREIGN PATENT DOCUMENTS

JP        09057519 A  *  3/1997
JP       2007-283482      11/2007
(Continued)

OTHER PUBLICATIONS

Office Action dated Oct. 4, 2013 issued in Japanese counterpart application (No. 2012-551927).
(Continued)

*Primary Examiner* — Sunil K Singh
*Assistant Examiner* — Sara Addisu
(74) *Attorney, Agent, or Firm* — Womble Carlyle (57) ABSTRACT

A cutting insert has top and bottom surfaces in the thicknesswise direction, and front and rear surfaces in the widthwise direction. First and second cutting edges are formed in the lengthwise direction at intersection portions where the top surface intersects with the front and rear surfaces. Third and fourth cutting edges are formed in the lengthwise direction at intersection portions where the bottom surface intersects with the front and rear surfaces. The first to fourth cutting edges are divided by a plurality of recesses. The plurality of recesses are symmetric with respect to the lengthwise centerline (A), which runs between the first and third cutting edges on the front surface and are asymmetric with respect to the thicknesswise centerline (B) perpendicular to the lengthwise centerline (A).

19 Claims, 6 Drawing Sheets

(56) References Cited

U.S. PATENT DOCUMENTS

| | | | |
|---|---|---|---|
| 4,531,864 A | 7/1985 | Bylund | |
| 4,867,616 A * | 9/1989 | Jakubowicz | 407/58 |
| 4,936,719 A * | 6/1990 | Peters | 407/42 |
| 5,085,542 A * | 2/1992 | Nakayama et al. | 407/114 |
| 5,221,164 A * | 6/1993 | Allaire | 407/113 |
| 5,791,832 A * | 8/1998 | Yamayose | 407/113 |
| 5,810,518 A * | 9/1998 | Wiman et al. | 407/102 |
| 5,921,721 A * | 7/1999 | Hintze et al. | 407/113 |
| 5,947,650 A * | 9/1999 | Satran et al. | 407/113 |
| 6,238,146 B1 * | 5/2001 | Satran et al. | 407/113 |
| 6,447,218 B1 * | 9/2002 | Lagerberg | 407/114 |
| 6,632,051 B1 * | 10/2003 | Wermeister | 407/114 |
| 6,862,966 B2 * | 3/2005 | Knapp | 82/1.11 |
| 6,957,933 B2 * | 10/2005 | Pachao-Morbitzer et al. | 407/11 |
| 7,118,311 B2 | 10/2006 | Aström | |
| 7,549,824 B2 * | 6/2009 | Agic | 407/42 |
| 7,591,614 B2 * | 9/2009 | Craig | 407/66 |
| 7,611,310 B2 * | 11/2009 | Isaksson | 407/11 |
| 7,857,555 B2 * | 12/2010 | Wermeister | 407/101 |
| 7,905,688 B2 * | 3/2011 | Ertl et al. | 407/42 |
| 8,025,465 B2 * | 9/2011 | Ishida | 407/114 |
| 8,029,213 B2 * | 10/2011 | Tanaka et al. | 407/114 |
| 8,033,764 B2 * | 10/2011 | Noggle | 407/113 |
| 8,113,746 B2 * | 2/2012 | Koga | 407/113 |
| 8,142,113 B2 * | 3/2012 | Ishida | 407/113 |
| 8,210,777 B2 * | 7/2012 | Ishida | 407/113 |
| 8,337,123 B2 * | 12/2012 | Ishida | 407/42 |
| 8,419,320 B2 * | 4/2013 | Sung et al. | 407/113 |
| 8,684,642 B2 * | 4/2014 | Koga | 409/132 |
| 8,740,510 B2 * | 6/2014 | Ishida | 407/61 |
| 2003/0113175 A1 | 6/2003 | Wermeister | |
| 2004/0109733 A1 * | 6/2004 | Fouquer | 407/113 |
| 2009/0245950 A1 | 10/2009 | Tanaka et al. | |
| 2011/0170963 A1 * | 7/2011 | Smilovici et al. | 407/42 |

FOREIGN PATENT DOCUMENTS

| | | | |
|---|---|---|---|
| JP | 2008000840 A * | 1/2008 | |
| JP | 06-007856 | 10/2009 | |

OTHER PUBLICATIONS

International Search Report in PCT/KR2011/001089, dated Oct. 24, 2011.

Written Opinion in PCT/KR2011/001089, dated Oct. 24, 2011.

Office Action in Korean application No. 10-2010-0015388, dated Oct. 25, 2011.

* cited by examiner

CUTTING INSERT HAVING CUTTING EDGES DIVIDED BY RECESSES AND A MILLING CUTTER PROVIDED WITH THE SAME

RELATED APPLICATIONS

This is a 35 USC 371 U.S. National Phase of International Application No. PCT/KR2011/001089 filed 18-Feb-2011 and published in English as WO 2011/102670A2 on 25-Aug-2011, which claims priority to KR 10-2010-0015388, filed 19-Feb-2010. The contents of the aforementioned applications are incorporated by reference in their entirety.

TECHNICAL FIELD

The present invention relates to a cutting insert having cutting edges divided by a plurality of recesses and a milling cutter provided with the same.

BACKGROUND ART

In a milling operation, many cutting edges are generally mounted on the side surface of a milling cutter to machine a work piece. Thus, the machining performance varies remarkably depending on the depth of cut and the shape of a cutting insert.

Due to improvements in milling machines, high speed and high feed machining is available. To improve productivity, such machines have been adopted and a method of removing large chips at once with a deep cut is generally used.

In such a milling operation, if the cut is deep, then the cutting resistance is greatly increased. Thus, if the milling machine with a small horse power is excessively operated under the above-mentioned conditions, then the main axis of the milling machine or table may be damaged. Further, this causes vibration and noise, thereby decreasing machining accuracy and tool life.

Figure 1:
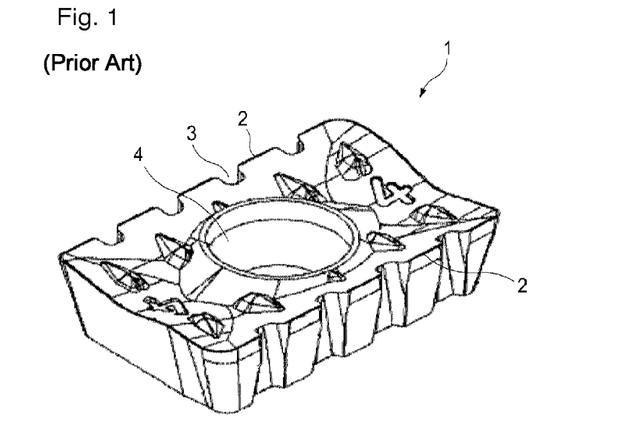
FIG. 1 shows a conventional cutting insert.
Figure 2:
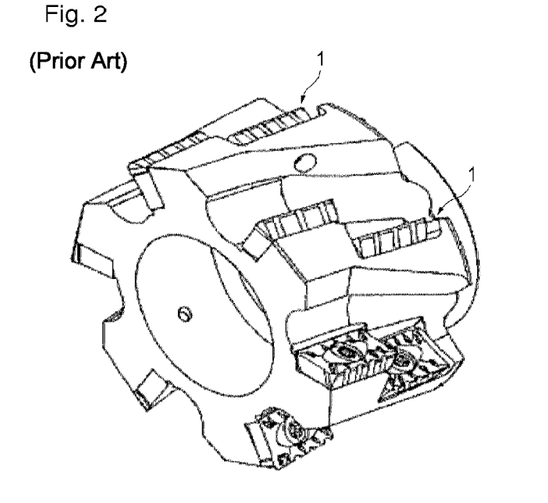
FIG. 2 shows a milling cutter employed with the cutting insert of FIG. 1.

To overcome such problems, a cutting insert, the cutting edges of which are divided by recesses to reduce cutting resistance, has been known. FIG. 1 shows a conventional cutting insert. As shown in FIG. 1, cutting edges 2 of a cutting insert 1 are divided by a plurality of recesses 3. The recesses are formed to have 180 degree rotational symmetry about a through hole 4 formed at the center of the cutting insert. Further, as shown in FIG. 2, the cutting inserts 1 are mounted on the side of the milling cutter.

In a milling operation, a work piece is first cut by the cutting insert 1, which has four recesses. The part of the work piece, which is not cut due to the recesses 3 of the cutting insert 1, is then cut by a following cutting insert 1' that has three recesses.

As such, in the conventional milling operations, two types of cutting inserts, which have different recesses from each other, are manufactured and stored. This tends to increase maintenance costs as well as manufacturing costs. Further, having two types of inserts creates the possibility that an operator may not mount the two different cutting inserts in turn and may instead erroneously mount two of the same type of cutting inserts.

SUMMARY

The objective of the present invention is to overcome the above-described shortcomings of the prior art. The objective of the present invention is to reduce the manufacturing and maintenance costs by enabling milling operation to use a single type of cutting insert. Another objective of the present invention is to reduce the chance of an operator's mistake from occurring when mounting the cutting inserts.

According to one embodiment of the present invention, the cutting insert has a top surface and a bottom surface in the thicknesswise direction, as well as a front surface and a rear surface in the widthwise direction. A first cutting edge and a second cutting edge are formed in the lengthwise direction at intersection portions where the top surface intersects with the front surface and the rear surface. A third cutting edge and a fourth cutting edge are formed in the lengthwise direction at intersection portions where the bottom surface intersects with the front surface and the rear surface. The first to fourth cutting edges are divided by a plurality of recesses. Further, rake surfaces are formed on the front and rear surfaces. The rake surfaces extend from the first to fourth cutting edges in an inwardly direction of the cutting insert. The plurality of recesses extends in the widthwise direction from the first cutting edge to the second cutting edge and from the third cutting edge to the fourth cutting edge. Also, the plurality of recesses is symmetric with respect to a lengthwise centerline A, which runs between the first and third cutting edges on the front surface. The plurality of recesses is asymmetric with respect to a thicknesswise centerline B, which is perpendicular to the lengthwise centerline A.

According to the present invention, the cutting insert further comprises a through hole that penetrates the top and bottom surfaces and is located apart from the center of the cutting insert in the lengthwise direction.

Further, the top and bottom surfaces have a parallelogram shape. Also, the top and bottom surfaces may be asymmetric under a 180 degree rotation with respect to a lengthwise centerline C of the cutting insert.

According to another embodiment of the present invention, a cutting insert has a top surface and a bottom surface in the thicknesswise direction, as well as a front surface and a rear surface in the widthwise direction. A pair of top surface cutting edges is formed in the lengthwise direction at intersection portions where the top surface intersects with the front surface and the rear surface. The top surface cutting edges are divided by a plurality of recesses. Rake surfaces are formed on the top surface and extend from the top surface cutting edges in an inwardly direction of the cutting insert. The plurality of recesses extends in the thicknesswise direction from the top surface cutting edges. The plurality of recesses is symmetric with respect to a lengthwise centerline C, which runs between the pair of top surface cutting edges, and is asymmetric with respect to a widthwise centerline D that is perpendicular to the lengthwise centerline C.

Moreover, according to another embodiment of the present invention, the cutting insert may further comprise a pair of bottom surface cutting edges, which is formed in a lengthwise direction at the intersection portions where the bottom surface intersects with the front surface and the rear surface. The front and rear surfaces have a parallelogram shape. The front and rear surfaces are symmetric under a 180 degree rotation with respect to a lengthwise centerline A of the cutting insert.

According to the present invention, since a milling operation can be performed with only a single type of cutting insert, manufacturing costs can be reduced. Further, since an operator maintains only a single type of cutting insert, maintenance costs can be also reduced. Moreover, the chance of an operator mistakenly mounting two of the same types of cutting inserts into a milling cutter can be eliminated.

DETAILED DESCRIPTION

Hereinafter, various embodiments according to the present invention will be described with reference to the accompanying drawings.

First Embodiment

Figure 3:
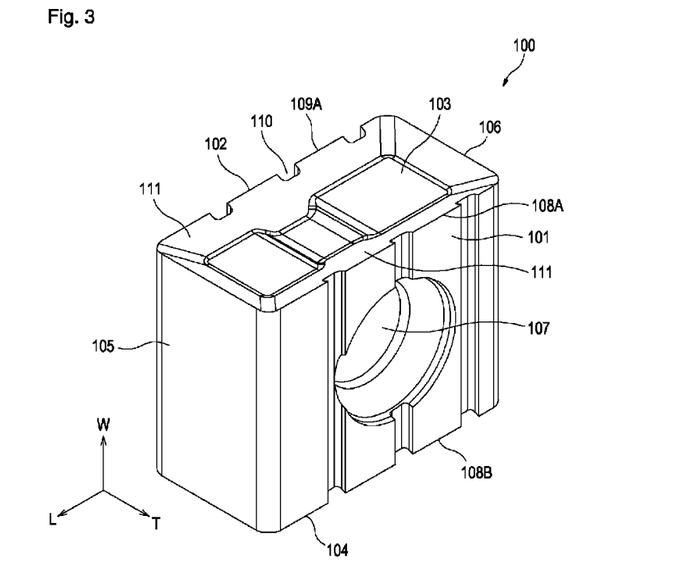
FIG. 3 is a perspective view of the cutting insert according to a first embodiment of the present invention.
Figure 4:
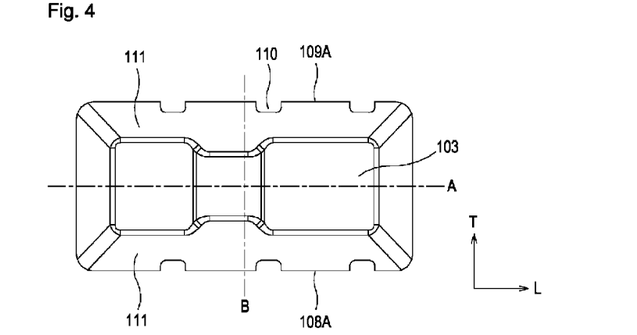
FIG. 4 is a front view of the cutting insert of FIG. 3.
Figure 5:
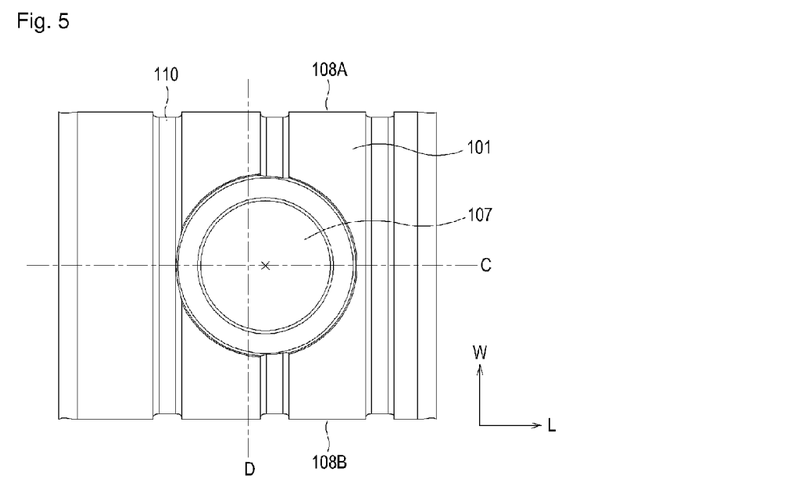
FIG. 5 is a top view of the cutting insert of FIG. 3.

FIG. 3 is a perspective view of the cutting insert according to a first embodiment of the present invention. FIG. 4 is a front view of the cutting insert of FIG. 3. FIG. 5 is a top view of the cutting insert of FIG. 3.

As shown in FIG. 3, a cutting insert 100 according to the present invention includes a top surface 101 and a bottom surface 102 in a thicknesswise direction T. The cutting insert 100 includes a front surface 103, a rear surface 104, a left side surface 105 and a right side surface 106, which extend between the top surface and the bottom surface. Further, the cutting insert 100 includes a through hole 107, which penetrates the top surface 101 and the bottom surface 102.

The cutting insert 100 includes a first cutting edge 108A and a second cutting edge 108B formed in a lengthwise direction L at intersection portions where the top surface 101 intersects with the front surface 103 and the rear surface 104. The cutting insert 100 also includes a third cutting edge 109A and a fourth cutting edge (not shown) formed in the lengthwise direction L at intersection portions where the bottom surface 102 intersects with the front surface 103 and the rear surface 104.

The first to fourth cutting edges 108A, 108B and 109A are divided by a plurality of recesses 110 as shown in FIG. 4. As shown in FIG. 5, the plurality of recesses 110 extends in a widthwise direction W from the first cutting edge 108A to the second cutting edge 108B and from the third cutting edge 109A to the fourth cutting edge. The recess 110 has a U-shape in cross-section. However, the recess may have other shapes in cross-section.

Rake surfaces 111 are formed on the front and the rear surfaces 103 and 104 and extend from the first to fourth cutting edges 108A, 108B and 109A in an inwardly direction of the cutting insert.

As shown in FIG. 4, at the front and rear surfaces 103 and 104, the plurality of recesses 110 is symmetric with respect to a lengthwise centerline A, which runs between the first and third cutting edges 108A and 109A, and is asymmetric with respect to a thicknesswise centerline B that is perpendicular to the lengthwise centerline A. Further, as shown in FIG. 5, at the top and bottom surfaces 101 and 102, the plurality of recesses 110 is symmetric with respect to a lengthwise centerline C, which runs between the front and rear surfaces 103 and 104, and is asymmetric with respect to a widthwise centerline D that is perpendicular to the lengthwise centerline C and runs between the left and right side surfaces 105 and 106.

As shown in FIG. 5, the through hole 107 penetrating the top and bottom surfaces 101 and 102 is located such that its center is located apart along the centerline C from a center of the cutting insert in the lengthwise direction L.

A milling cutter wherein the cutting insert according to the first embodiment is mounted Hereinafter, a milling cutter 150 wherein the cutting inserts according to the first embodiment are mounted and a milling operation using the milling cutter will be described.

Figure 6:
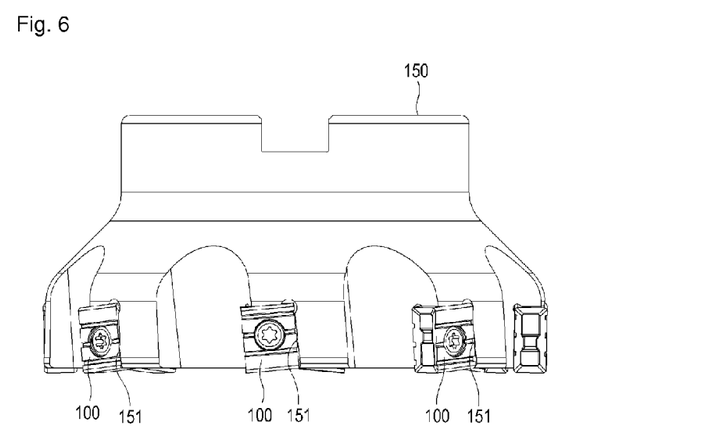
FIG. 6 shows a milling cutter wherein the cutting inserts of FIG. 3 are mounted.

As shown in FIG. 6, the milling cutter 150 includes a plurality of pockets 151 wherein the cutting inserts 100 are mounted and fastening means to secure the cutting inserts according to the present invention in the pockets. For example, the fastening means may be a screw fastening hole where a screw, which passes through the through hole 107 of the cutting insert, is fastened.

Figure 7:
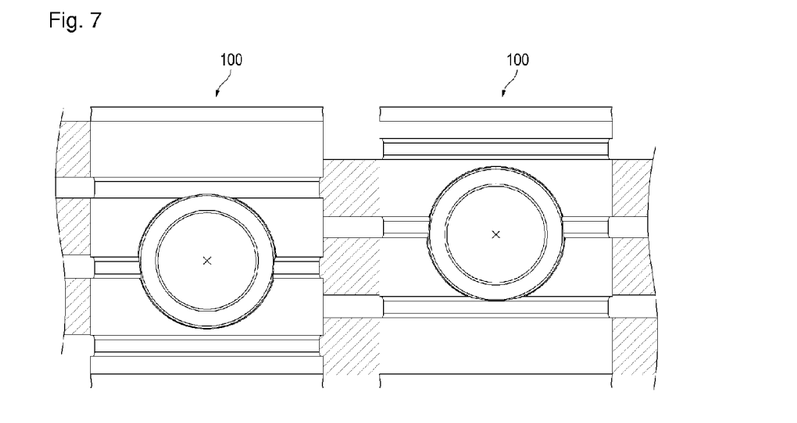
FIG. 7 shows that the cutting inserts of FIG. 3 are in cutting operation after they are mounted on the milling cutter.

As shown in FIG. 6, when the cutting inserts 100 are mounted in the milling cutter, the cutting inserts 100 are mounted in the pockets of the milling cutter so as to be reversed by 180 degrees with respect to an axis of the through hole 107. Since the plurality of recesses 110 is asymmetric with respect to the centerlines B and D, when the cutting inserts 100 are mounted in the pockets so as to be reversed by 180 degrees, the recesses formed at the cutting edges are staggered with each other as shown in FIG. 7. Since the recesses formed at the cutting edges are staggered with each other, a part of a workpiece, which is not cut due to recesses of a leading cutting insert, will be cut by a trailing cutting insert that follows the leading cutting insert. The hatched areas in FIG. 7 show parts of the workpiece cut by each cutting insert.

Further, since the through hole 107 of the cutting insert 100 is configured so as to be apart from the center of the cutting insert in the lengthwise direction L as shown in FIG. 5, the heights of the center of the through holes 107 are different from each other as shown in FIG. 7. Thus, if the locations of the screw fastening holes formed in the pockets of the milling cutter are configured so as to correspond to the heights of the through holes 107, then the cutting inserts 100 are precisely mounted in the pockets 151 of the milling cutter only when the position of the screw fastening hole is identical to that of the through hole. By doing so, a mounting error can be prevented.

Second Embodiment

Figure 8:
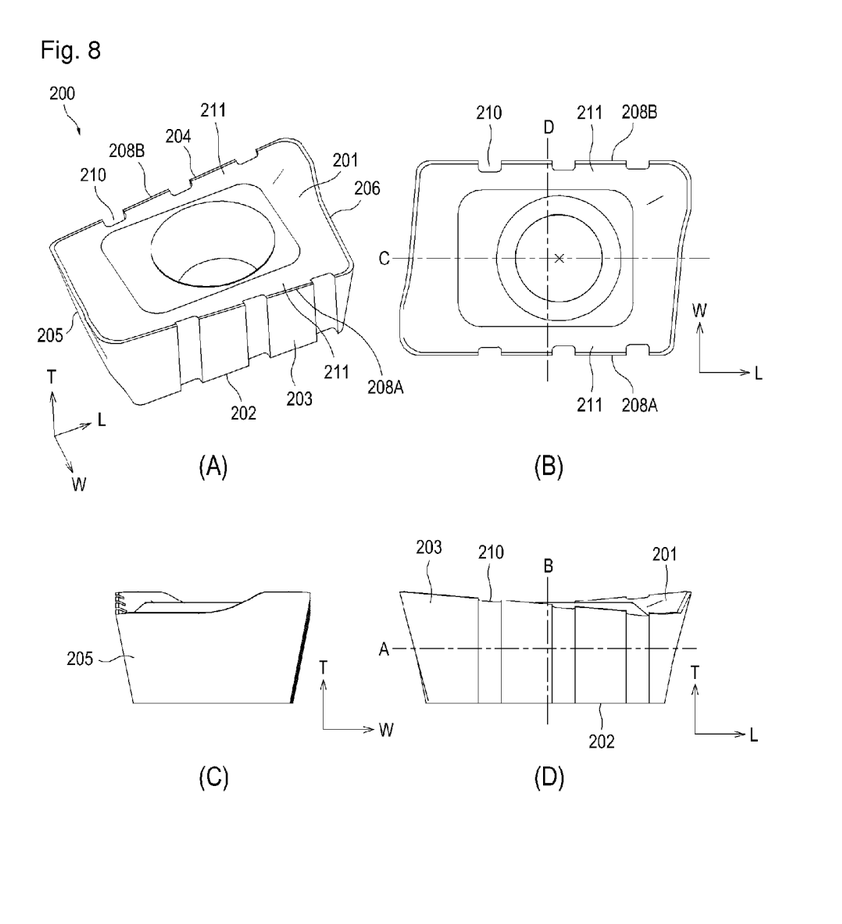
FIG. 8 shows a cutting insert according to a second embodiment of the present invention.

FIG. 8 shows a cutting insert 200 according to a second embodiment of the present invention. As shown in FIG. 8 (A), the cutting insert 200 includes a pair of top surface cutting edges 208A and 208B formed at intersection portions where a top surface 201 intersects with a front surface 203 and a rear surface 204. The cutting insert 200 includes a plurality of recesses 210, which divides the top surface cutting edges 208A and 208B. Rake surfaces 211 are formed on the top surface and extend from the top surface cutting edges 208A and 208B in an inwardly direction of the cutting insert. The plurality of recesses 210 extends in the thicknesswise direction T from the top surface cutting edges 208A and 208B. Further, the plurality of recess 210 is symmetric with respect to a lengthwise centerline C, which runs between the pair of top surface cutting edges 208A and 208B as shown in FIG. 8 (B), and is asymmetric with respect to a widthwise centerline D that is perpendicular to the lengthwise centerline C. Further, as shown in FIG. 8 (D), at the front and rear surfaces 203 and 204, the plurality of recesses 210 is symmetric with respect to a lengthwise centerline A, which runs between the top and bottom surfaces 201 and 202, and is asymmetric with respect to a thicknesswise centerline B that is perpendicular to the lengthwise centerline A and runs between the left and right side surfaces 205 and 206.

Third Embodiment

Figure 9:
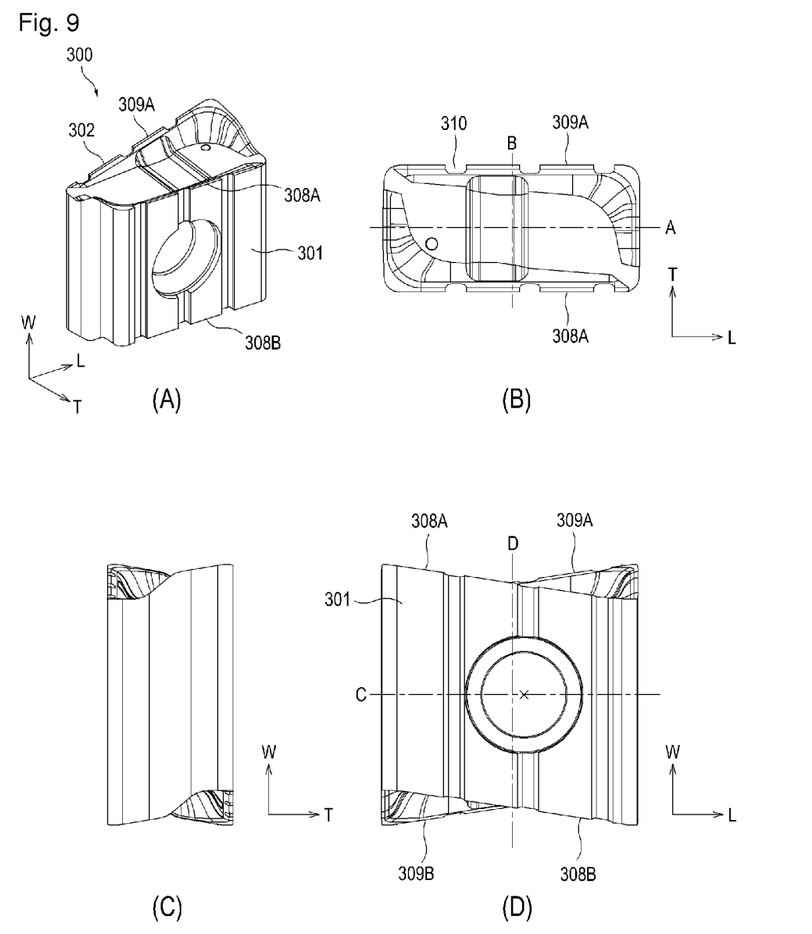
FIG. 9 shows a cutting insert according to a third embodiment of the present invention.

FIG. 9 shows a cutting insert 300 according to a third embodiment of the present invention. Unlike the cutting insert 100 according to the first embodiment, the top and bottom surfaces 301 and 302 of the cutting insert 300 have a substantially parallelogram shape. Further, the cutting edges 308A, 308B, 309A and 309B define a certain angle with respect to the centerline C. Moreover, the top and bottom surfaces 301 and 302 are symmetric under a 180 degree rotation with respect to a lengthwise centerline C.

Fourth Embodiment

Figure 10:
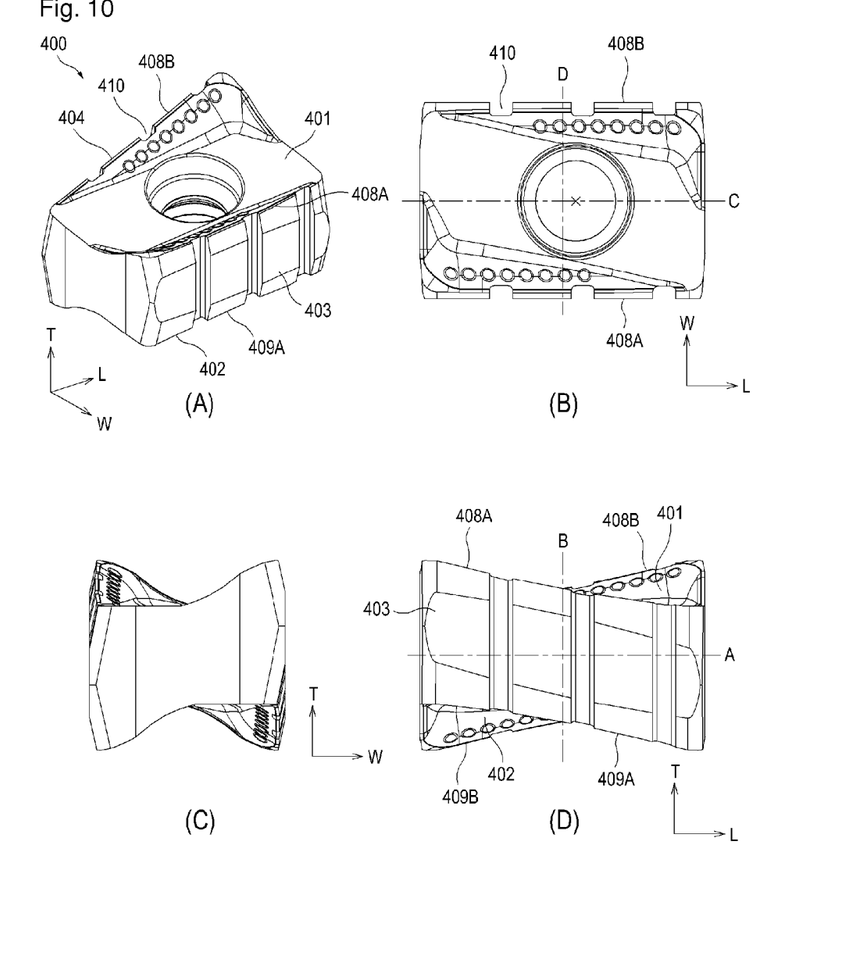
FIG. 10 shows a cutting insert according to a fourth embodiment of the present invention.

FIG. 10 shows a cutting insert 400 according to a fourth embodiment of the present invention. The cutting insert 200 according to the second embodiment of the present invention is a one-sided cutting insert, whereas the cutting insert 400 is a double-sided cutting insert. The cutting insert 400 further includes a pair of bottom surface cutting edges 409A and 409B, which is formed in the lengthwise direction at intersection portions where the bottom surface 402 intersects with the front surface 403 and the rear surface 404. The plurality of recesses 410 extends from the top surface cutting edges 408A and 408B to the bottom surface cutting edges 409A and 409B. The front and rear surfaces 403 and 404 have a parallelogram shape. The cutting edges 408A, 408B, 409A and 409B define a certain angle with respect to the centerline A. Further, the front and rear surfaces 403 and 404 are symmetric under a 180 degree rotation with respect to a lengthwise centerline A of the cutting insert.

The aforementioned embodiments of the present invention are disclosed for illustrative purpose only. It will be apparent to those skilled in the art that various modifications and changes may be made within the scope of the present invention. For example, a mounting error prevention structure comprising concavo-convex shapes may be configured in the cutting insert and the pocket of the milling cutter to prevent the cutting insert from being erroneously mounted in the milling cutter.

The invention claimed is:

1. A cutting insert having top and bottom surfaces spaced apart from one another in a thicknesswise direction and front and rear surfaces spaced apart from one another in a widthwise direction, comprising;
   a first cutting edge and a second cutting edge formed in a lengthwise direction at intersection portions where the top surface intersects with the front surface and the rear surface, respectively;
   a third cutting edge and a fourth cutting edge formed in the lengthwise direction at intersection portions where the bottom surface intersects with the front surface and the rear surface, respectively;
   a plurality of recesses dividing the first to fourth cutting edges;
   rake surfaces formed on the front and rear surfaces and extending from each of the first to fourth cutting edges in an inward direction of the cutting insert;
   wherein the plurality of recesses extend in the widthwise direction along the top surface from the first cutting edge to the second cutting edge and along the bottom surface from the third cutting edge to the fourth cutting edge;
   wherein the plurality of recesses are symmetric with respect to a lengthwise centerline (A) running between the first and third cutting edges on the front surface in a front view of the cutting insert; and
   wherein the plurality of recesses are asymmetric with respect to a thicknesswise centerline (B) perpendicular to the lengthwise centerline (A), in said front view of the cutting insert.

2. The cutting insert of claim 1, further comprising a through hole that penetrates the top and bottom surfaces; and wherein a center of the through hole is located apart from the center of the cutting insert in the lengthwise direction, in a top view of the cutting insert.

3. The cutting insert of claim 1,
   wherein the top and bottom surfaces have a parallelogram shape; and
   wherein the top and bottom surfaces are symmetric under a 180 degree rotation with respect to a lengthwise centerline (C) of the cutting insert, which lengthwise centerline (C) passes through opposing left and right side surfaces of the cutting insert.

4. A milling cutter, comprising:
   a plurality of pockets, each having mounted therein a cutting insert in accordance with claim 1; and
   wherein the recesses of the cutting inserts are located to be staggered from each other in neighboring pockets among the plurality of pockets.

5. The milling cutter of claim 4,
   wherein each of the plurality of pockets comprises a screw fastening hole; and
   wherein locations of screw fastening holes in neighboring pockets are arranged to be staggered up and down from each other.

6. The cutting insert of claim 1, wherein:
   the front and rear surfaces are rectangular; and
   the top and bottom surfaces are rectangular.

7. A cutting insert having top and bottom surfaces spaced apart from one another in a thicknesswise direction and front and rear surfaces spaced apart from one another in a widthwise direction, comprising;
   a pair of top surface cutting edges formed in a lengthwise direction at intersection portions where the top surface intersects with the front surface and the rear surface;
   a plurality of recesses dividing the top surface cutting edges;
   rake surfaces formed on the top surface and extending from the top surface cutting edges in an inward direction of the cutting insert;
   wherein the plurality of recesses extend in the thicknesswise direction from the top surface cutting edges;
   wherein the plurality of recesses are symmetric with respect to a lengthwise centerline (C) running between the pair of top surface cutting edges, in a top view of the cutting insert; and
   wherein the plurality of recesses are asymmetric with respect to a widthwise centerline (D) perpendicular to the lengthwise centerline (C), in said top view of the cutting insert.

8. The cutting insert of claim 7, further comprising a through hole that penetrates the top and bottom surfaces; and wherein a center of the through hole is located apart from the center of the cutting insert in the lengthwise direction, in said top view of the cutting insert.

9. The cutting insert of claim 7, further comprising a pair of bottom surface cutting edges formed in the lengthwise direction at the intersection portions where the bottom surface intersects with the front surface and the rear surface;
   wherein the front and rear surfaces have a parallelogram shape; and
   wherein the front and rear surfaces are symmetric under a 180 degree rotation with respect to a lengthwise centerline (A) of the cutting insert, which lengthwise centerline (A) passes through opposing left and right side surfaces of the cutting insert.

10. A milling cutter, comprising:

a plurality of pockets, each having mounted therein a cutting insert in accordance with claim 7; and wherein the recesses of the cutting inserts are located to be staggered from each other in neighboring pockets among the plurality of pockets.

11. The milling cutter of claim 10, wherein each of the plurality of pockets comprises a screw fastening hole; and wherein locations of screw fastening holes in neighboring pockets are arranged to be staggered up and down from each other.

12. The cutting insert of claim 7, wherein:

the cutting insert is one-sided;

the front and rear surfaces are asymmetric under a 180 degree rotation with respect to a lengthwise centerline (A) of the cutting insert, which lengthwise centerline (A) passes through opposing left and right side surfaces of the cutting insert; and the front and rear surfaces are asymmetric under a 180 degree rotation with respect to a thicknesswise centerline (B) of the cutting insert, which thicknesswise centerline (B) passes through the top and bottom surfaces of the cutting insert.

13. A cutting insert comprising:

top and bottom surfaces spaced apart from one another along a first direction;

front and rear surfaces spaced apart from one another along a second direction that is perpendicular to the first direction;

a pair of side surfaces spaced apart from one another along a lengthwise direction of the cutting insert, the lengthwise direction being perpendicular to both the first and second directions;

spaced apart first and second cutting edges formed at intersection portions of the top surface with the front and rear surfaces, respectively, the first and second cutting edges extending along the lengthwise direction;

a rake surface associated with each of the first and second cutting edges;

an insert through hole that penetrates the top and bottom surfaces; and a plurality of recesses dividing each of the first and second cutting edges;

wherein:

a center of the through hole is located apart from a center of the top surface, in the lengthwise direction;

in a view of the rake surfaces, the recesses of the first and second cutting edges are:

symmetric about a first centerline (A, C) passing between the first and second cutting edges and intersecting the side surfaces; and asymmetric about a second centerline (B, D) perpendicular to the first centerline and intersecting the first and second cutting edges.

14. The cutting insert of claim 13, wherein:

the rake surfaces are formed on the front surface.

15. The cutting insert of claim 14, wherein:

wherein the top and bottom surfaces have a parallelogram shape.

16. The cutting insert of claim 13, wherein:

the rake surfaces are formed on the top surface.

17. The cutting insert of claim 16, wherein:

wherein the front and rear surfaces have a parallelogram shape.

18. The cutting insert of claim 16, wherein:

the cutting insert is one-sided.

19. The cutting insert of claim 16, wherein:

the cutting insert is two-sided.

* * * * *